US010334013B2

United States Patent
Brown et al.

(10) Patent No.: US 10,334,013 B2
(45) Date of Patent: Jun. 25, 2019

(54) AVOIDING WEB REQUEST FAILURES BEFORE THEY OCCUR BY COMPONENT ANALYSIS

(71) Applicant: International Business Machines Corporation, Armonk, NY (US)

(72) Inventors: Kyle G. Brown, Apex, NC (US); Samir A. Nasser, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 472 days.

(21) Appl. No.: 14/950,925

(22) Filed: Nov. 24, 2015

(65) Prior Publication Data

US 2017/0149631 A1    May 25, 2017

(51) Int. Cl.
  *H04L 12/24* (2006.01)
  *H04L 12/26* (2006.01)
  *H04L 29/08* (2006.01)

(52) U.S. Cl.
  CPC ............ *H04L 67/02* (2013.01); *H04L 41/142* (2013.01); *H04L 41/5083* (2013.01); *H04L 43/026* (2013.01)

(58) Field of Classification Search
  USPC ....................................................... 709/224
  See application file for complete search history.

(56) References Cited

U.S. PATENT DOCUMENTS

| 8,392,558 | B1* | 3/2013 | Ahuja ..................... G06F 9/505 709/223 |
| 8,752,042 | B2 | 6/2014 | Ratica |
| 9,542,296 | B1* | 1/2017 | Engers ................ G06F 11/3452 |
| 2003/0233602 | A1* | 12/2003 | Lindquist .............. G06F 9/5055 714/47.1 |
| 2004/0225911 | A1* | 11/2004 | Smith ................. G06F 11/2257 714/47.3 |
| 2010/0241891 | A1* | 9/2010 | Beasley ................ G06F 11/008 714/1 |
| 2012/0151277 | A1 | 6/2012 | Jung et al. |

* cited by examiner

*Primary Examiner* — Hermon Asres
(74) *Attorney, Agent, or Firm* — Cantor Colburn LLP; Richard Wilhelm (57) ABSTRACT

Disclosed herein is a method for predicting and avoiding request failures. The method includes receiving a request for access to at least one web service and analyzing the request to identify at least one probabilistic resource tree for handling the request. The method further includes detecting a problem preventing a usage of a resource in the at least one probabilistic resource tree. The problem causes the request to fail upon implementation of the request. Furthermore, the method includes performing an action to avoid the implementation of the request.

6 Claims, 8 Drawing Sheets

AVOIDING WEB REQUEST FAILURES BEFORE THEY OCCUR BY COMPONENT ANALYSIS

BACKGROUND

The present disclosure relates generally to avoiding web request failures before they occur by component analysis.

In general, a web request can be a web service implementation or any other response to a request provided by an application server. Web requests can be implemented with respect to a collaboration of a number of different hardware and software components amongst databases and/or servers. For instance, an application of an application server can make a web request to one or more databases and/or web services implemented on other application servers. This web request can further require additional interaction from hardware and software components within these databases and/or servers. Yet, if any of these required databases, web services, servers, or components are unavailable, then the corresponding web request will fail.

In general, discovery of one of the required databases, web services, servers, or components being unavailable occurs during processing of the web request. In turn, by the time the application running in the application server discovers the failed component (e.g., after communicating to the databases and/or servers), the application server has already spent processing cycles and used memory (and other resources like thread pools) on performing processing that must be discarded due to an error related to the failed component.

Contemporary implementations exist to identify whether a particular component is available or in a slow or about to fail state. However, these contemporary implementations have limited efficiency as they can require a complex membership protocol to determine failing components and are more concerned with long-running activities rather than web requests. Further, contemporary implementations can also require that a composite web service be fully specified and that an execution of each step in an ongoing flow be "pre-processed" through a state machine, both of which are computationally expensive.

SUMMARY

Embodiments include a method, system, and computer program product for predicting and avoiding request failures including receiving a request for access to at least one web service; analyzing the request to identify at least one probabilistic resource tree for handling the request; detecting a problem preventing a usage of a resource in the at least one probabilistic resource tree, wherein the problem causes the request to fail upon implementation of the request; and performing an action to avoid the implementation of the request.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

Subject matter of embodiments herein is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
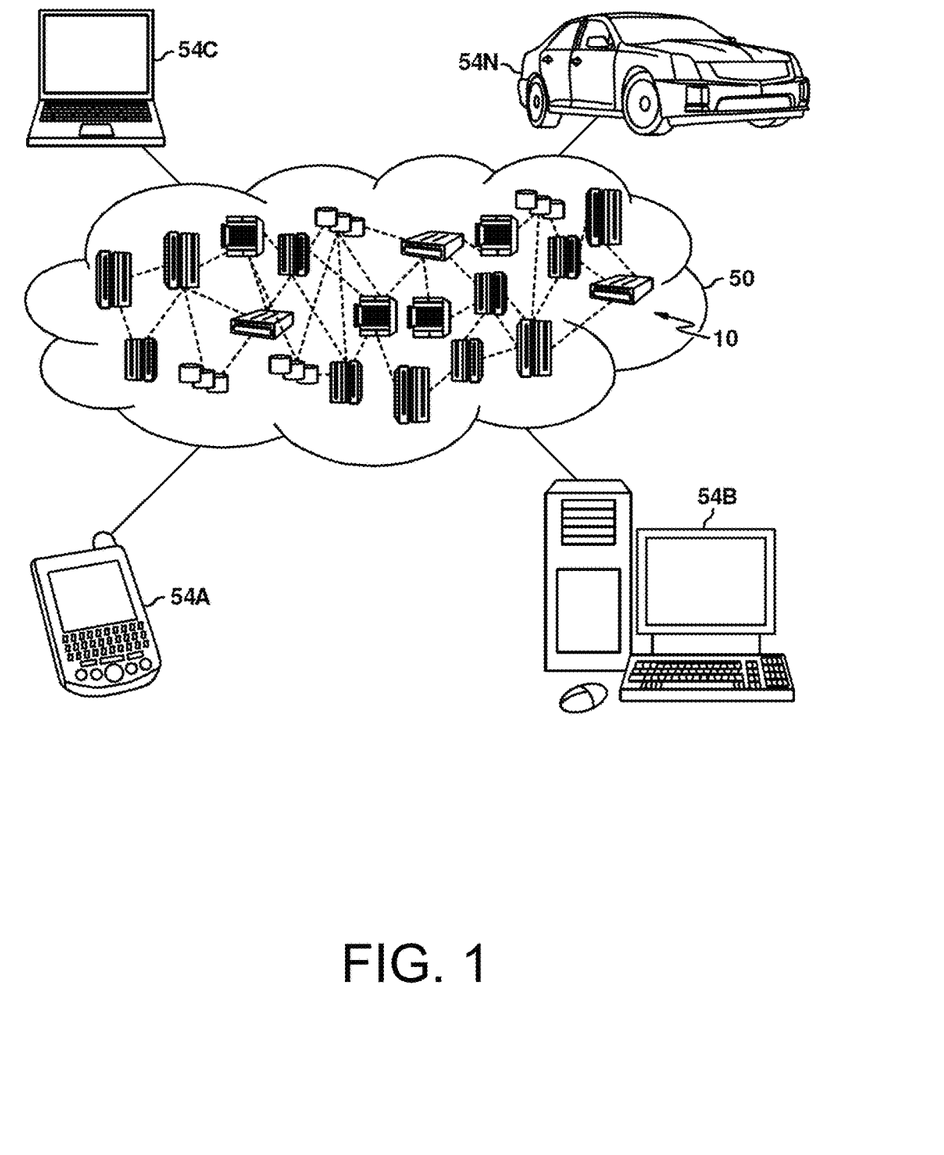
FIG. 1 depicts a cloud computing environment according to an embodiment.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
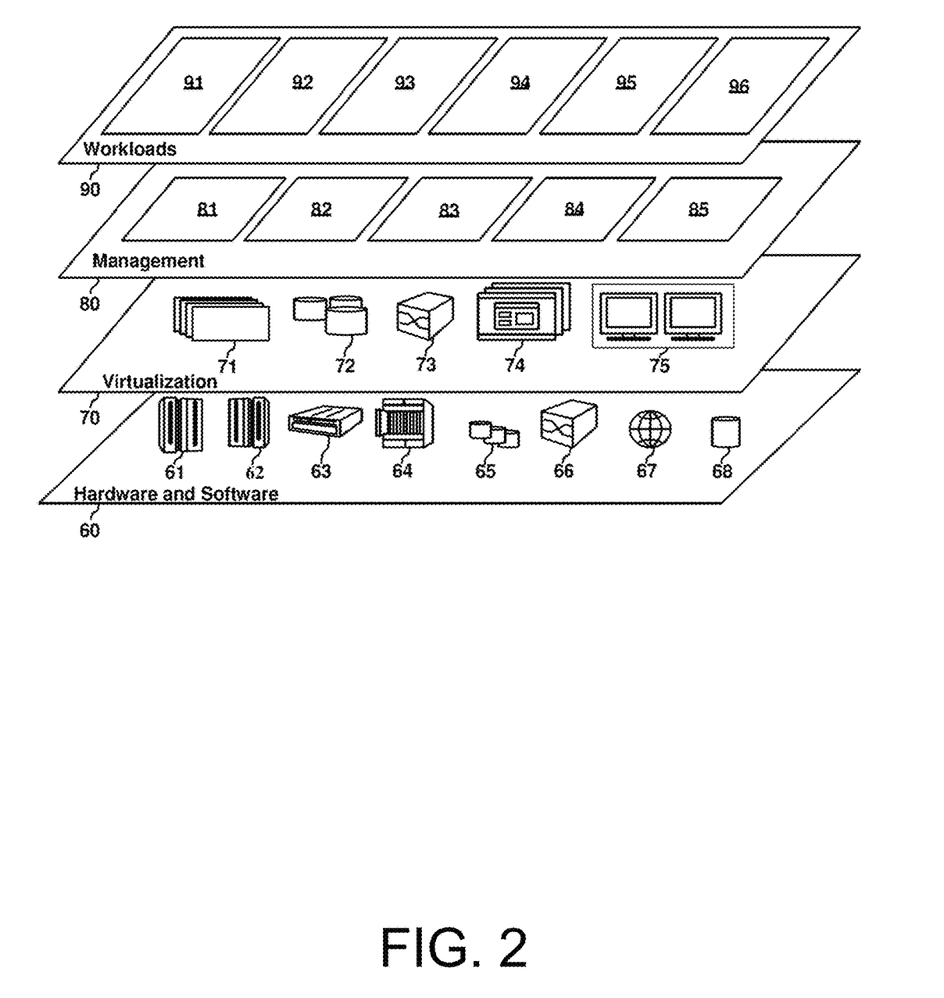
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments herein are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and component analysis 96.

In view of the above, embodiments described herein relate to a probability-based mechanism for quickly identifying whether a request, such as a web request, may include or cause at least one sub-request to a failed resource. Using this probability-based mechanism, embodiments described herein can stop or turn back the web request at the beginning of processing, and therefore avoid any loss of valuable processing cycles, memory, and other resources that would have served the web request (which is destined to fail).

In an example embodiment of the probability-based mechanism, an application server monitors and analyzes a history of resources and operations of those resources. The application server further performs a predictive web request failure operation that utilizes a statistical analysis heuristic to analyze the history. If the history indicates that a particular resource is likely to be offline or unavailable, then the application server can avoid utilizing processing cycles to implement any request that will need that offline/unavailable resource. For example, if a particular application utilizes eight databases and one of these eight databases is offline or unavailable, then the predictive web request failure operation by the application server determines which requests would eventually fail do to their need for the offline/unavailable database. These requests can be reverted so that processing cycles, memory, and other resources are not wasted.

Figure 3:
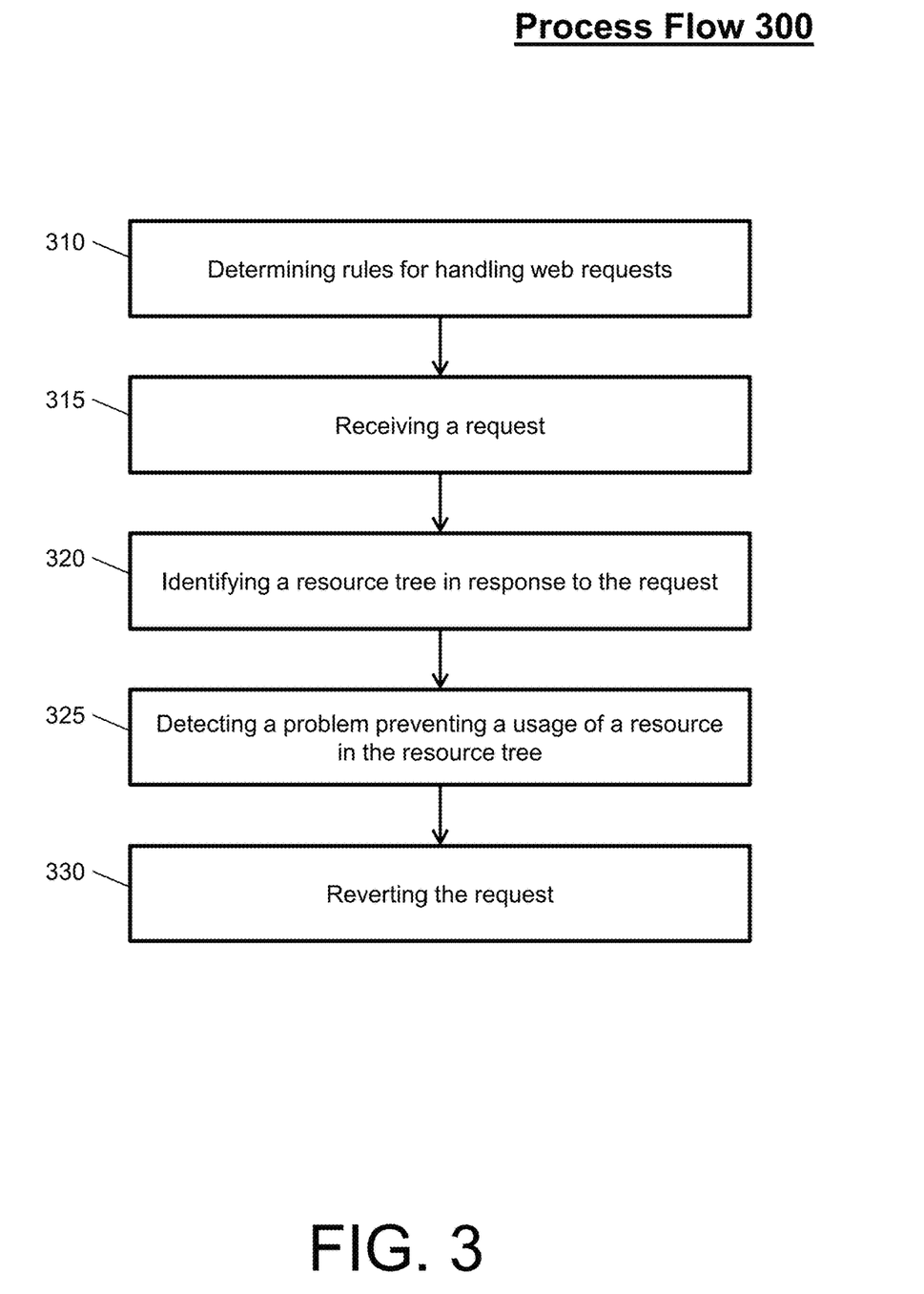
FIG. 3 depicts a process flow for avoiding web request failures before they occur by component analysis in accordance with an embodiment.

Turning now to FIG. 3, a process flow 300 is depicted for implementing the probability-based mechanism. The process flow 300 begins at block 310, where the application server determines rules for handling web requests. To determine these rules, the application server can manage and build a resource history of operations in a system of the application server, including monitoring and mapping classifications and attributes to probabilistic resource trees that identify resource utilization flows.

Figure 4:
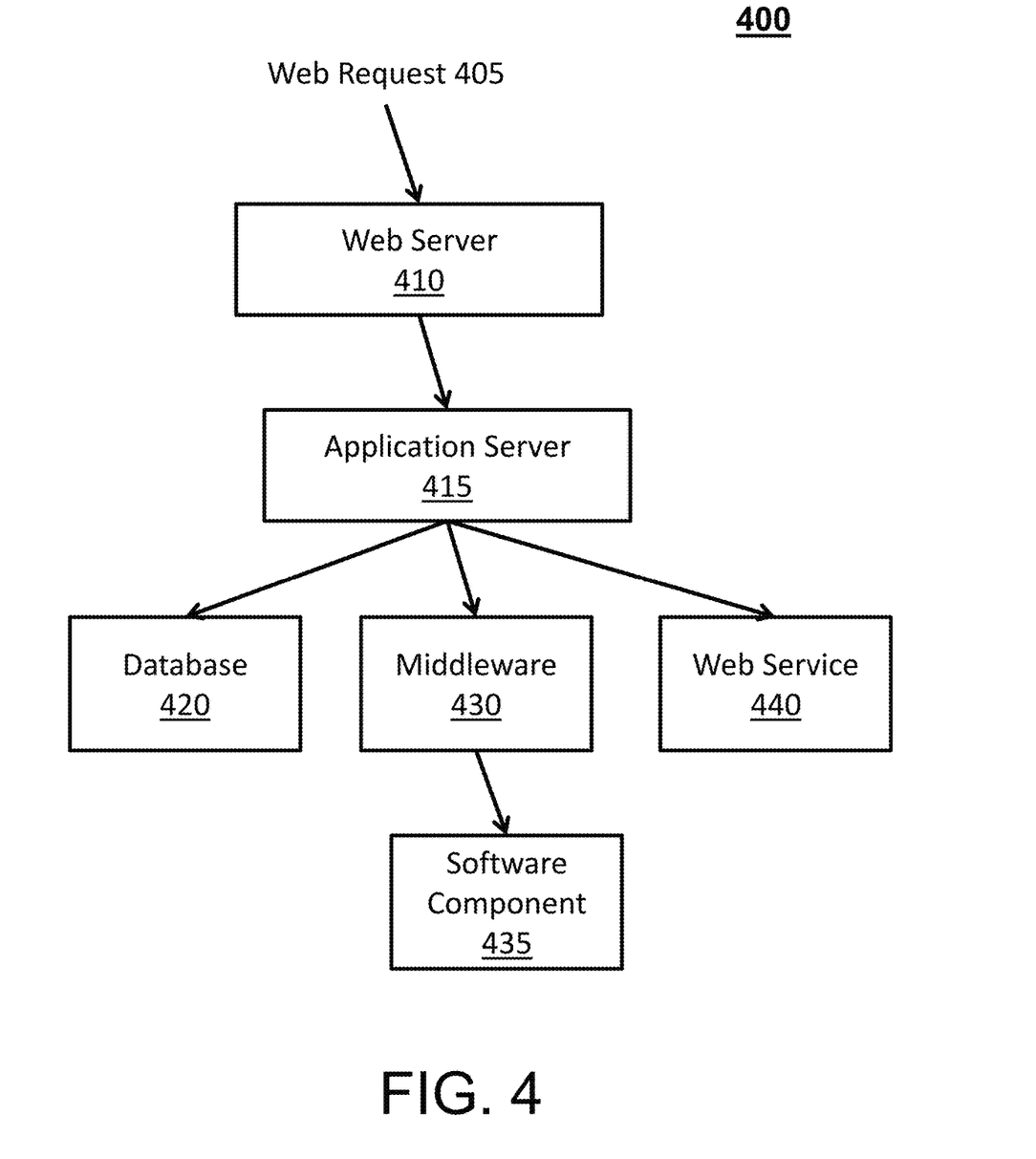
FIG. 4 illustrates an example node tree traversed by a web request in accordance with an embodiment.

At block 315, the application server receives a new web request. At block 320, this request is analyzed to identify at least one probabilistic resource tree for handling the new web request. The probabilistic resource tree (also referred to a resource tree of a node tree) is a path through a set of known servers that an implementation of a web request follows to fulfill that web request. Turning now to FIG. 4, an example node tree 400 traversed by a web request 405 is generally shown in accordance with an embodiment. The example node tree 400 is an acyclic directed graph that represents a process of fulfilling the web request 405, where the arrows are requests/sub-requests and nodes can be servers (or server types in clustered environments) that may fail.

As shown in FIG. 4, a web request 405 first arrives at a web server 410. The web server 410 directs the web request 405, e.g., through a plugin, to an application server 415. In the process of fulfilling the web request 405 by the application server 415, the implementation of the web request 405 running in the application server 415 issues a query to database 420, issues a request (e.g., implemented as a pseudo-synchronous request/response pair) through middleware 430 to a software component 435, and invokes a web service 440 (e.g., running on a separate application server from the application server 415).

Returning to FIG. 3 and block 320, probabilistic occurrence of failures within the probabilistic resource tree (e.g., example node tree 400) can be identified based on statistical analysis. That is, if the history indicates that the web service 440 is offline, then the application server can identify that there is a probabilistic occurrence with the example node tree 400. Note that a state of each node (e.g., up/down/slow) can also be identified through monitoring tools and with respect to a predetermined failure risk. For example, a problem with a node is detected if the predetermined failure risk is exceeded.

At block 325, the application server detects a problem preventing a usage of a resource in the probabilistic resource tree. Examples of the problem preventing resource usage include but are not limited to a node failure, an overload, a blocking, and a problem state. For example, since the web service 440 is likely offline, the example node tree 400 is unavailable and the new web request would fail if implemented.

At block 330, the application server reverts (stops or turns back) the web request. The web request can be reverted at the beginning of the implementation (when the failure is detected) to avoid a failure of the new web request and loss of valuable resources is avoided.

Figure 5:
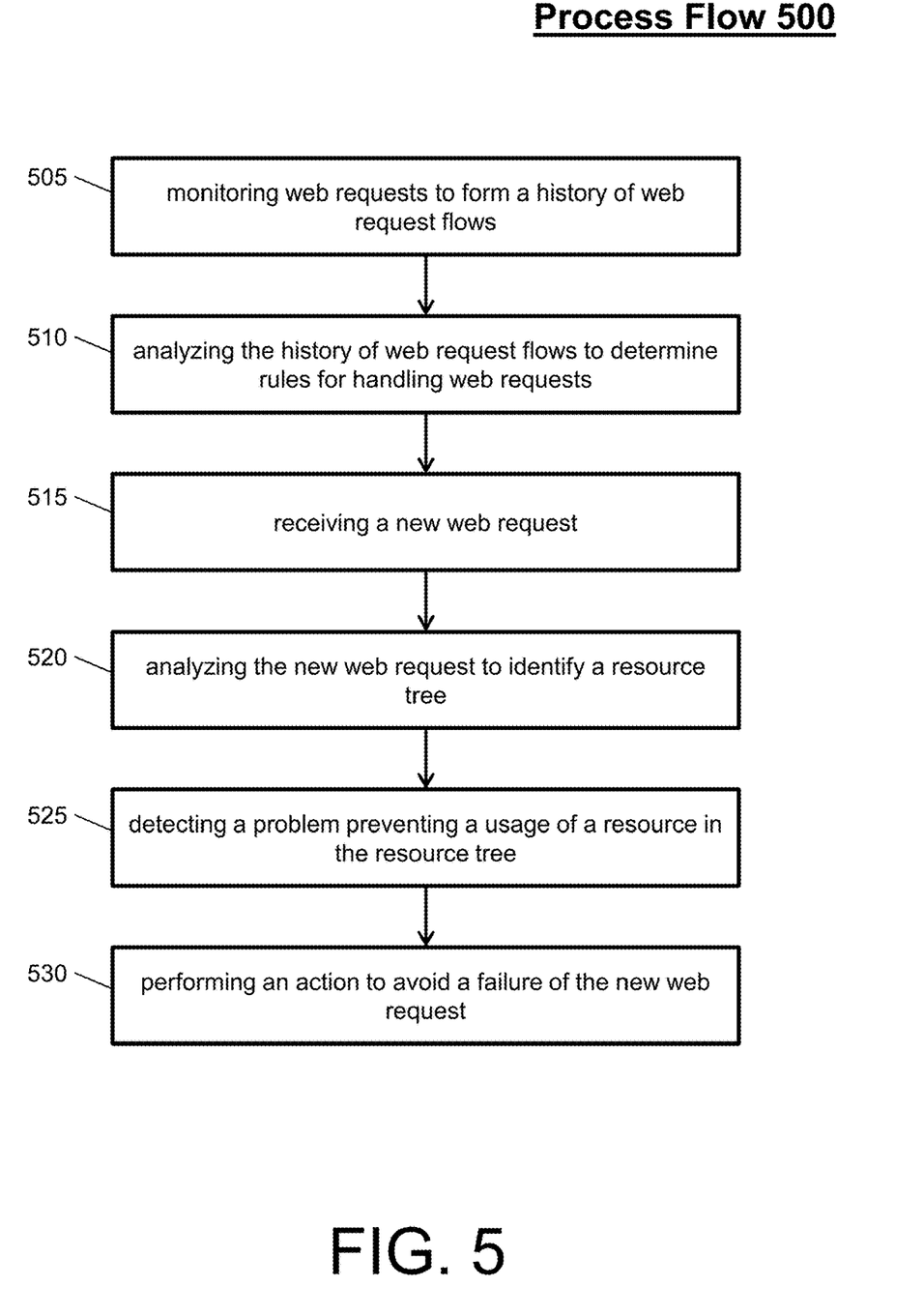
FIG. 5 depicts another process flow for avoiding web request failures before they occur by component analysis in accordance with an embodiment.

In another embodiment, FIG. 5 depicts a process flow 500 for avoiding web request failures before they occur by component analysis in accordance with an embodiment. The process flow 500 can be performed by a system, examples of which include but are not limited to systems that utilize hypertext transfer protocol (HTTP) or queuing protocols to manage web requests. In general, the process flow 500 deduces whether a particular request will have problems from a state of the nodes in a resource tree and whether that particular request can be short-circuited at the root of the tree to better serve other requests.

Figure 6:
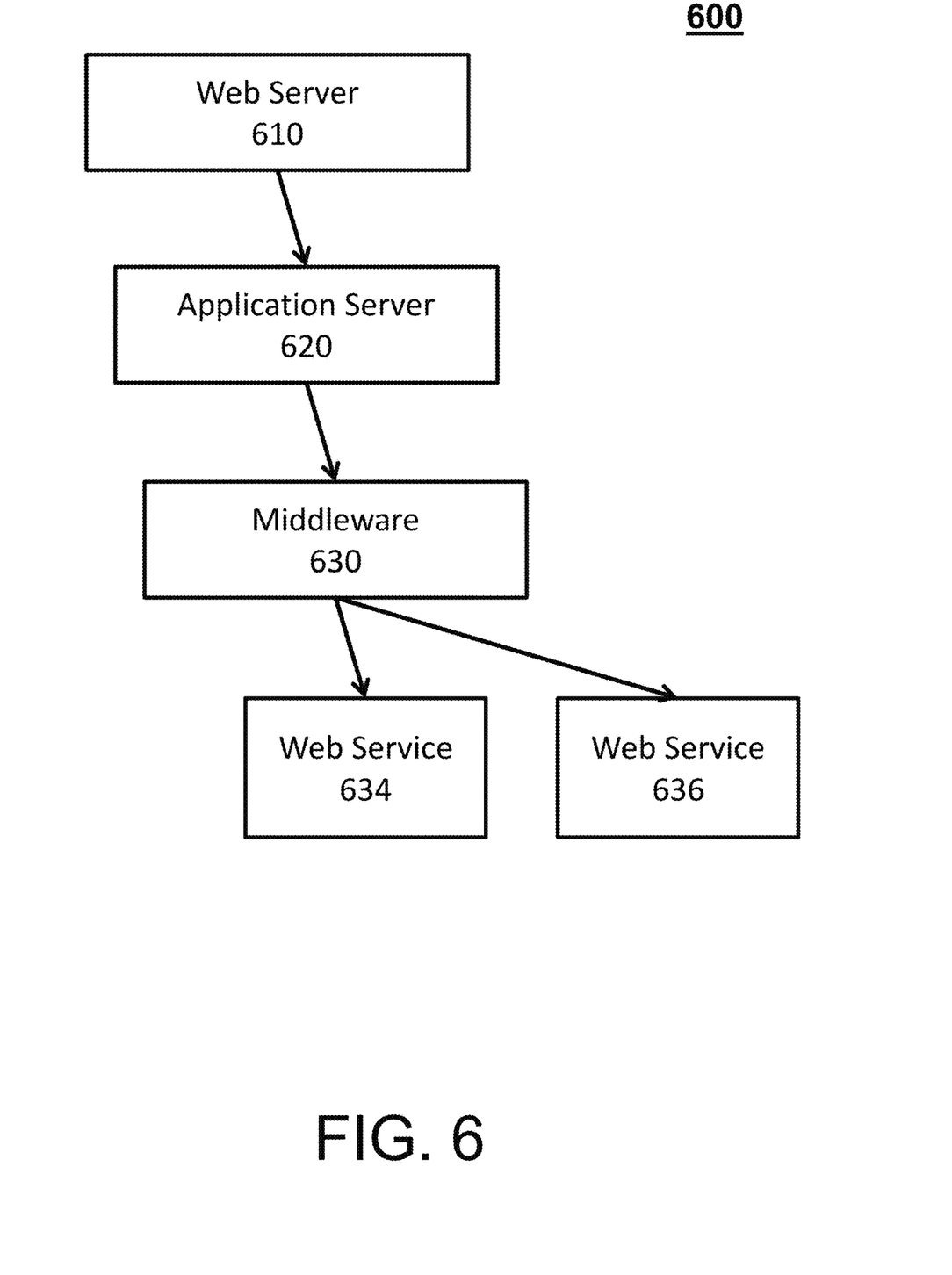
FIG. 6 illustrates a component analysis in accordance with an embodiment.

At block 505, a system monitors web requests to identify resource utilization flows. The resource utilization flow can comprise nodes and application components to form a history of web request flows. FIG. 6 illustrates a resource tree 600. The resource tree 600 comprises arrows, which are requests/sub-requests, and nodes, which are servers that may fail. The resource tree 600 can support or correspond to a plurality of requests, such that for each URI/query combination of requests corresponding to the resource tree 600 new nodes can be as needed. In an example, the resource tree 600 will be constructed based on the web server 610 issuing a plurality of first web request (e.g., a URI/query combination) to the application server 610. The application server 620 processes each first web request by sending subsequent requests to middleware 630. Middleware 630, in turn, sends sub-requests to web services 634 and 636. Note that the system can continually manage/generate an ongoing "parse tree," where unique leaves of the parse tree hang in place as appropriate to represent the parts of the URI and the other aspects of the request.

Figure 7:
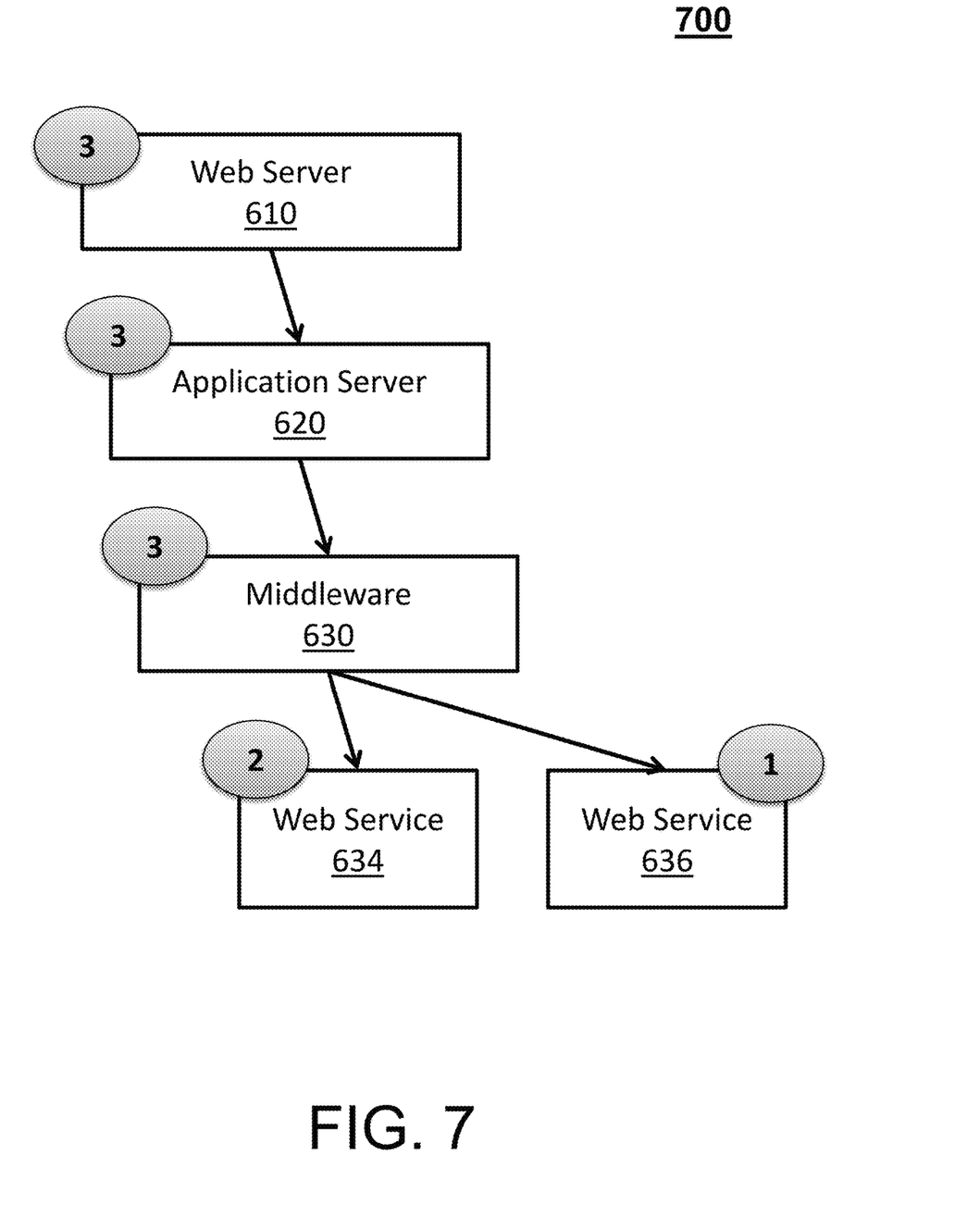
FIG. 7 continues the illustration of the component analysis of FIG. 5 in accordance with an embodiment.

At block 510, the system analyzes the history of web request flows to determine rules for handling web requests. FIG. 7 illustrates a resource tree 700, with annotations of three different web request flows illustrating the history of web request flows. As shown in FIG. 7, the web server 610 issues three web requests to the application server 620 (note the bubble with the numerical value of 3). Each request received by the application server 620 causes the sending a subsequent request to middleware 630 (note the bubble with the numerical value of 3). Two of these sub-requests are sent to web service 634, while one is sent to web service 636. Utilizing the data of the resource tree 700, the system can generate rules that classify requests by matching uniform resource identifiers (URI), HTTP request parameters, header values, data submitted from an HTTP POST, etc. Thus, the generation of multiple resource trees can be done automatically over a time period to build up a statistical sampling by utilizing monitoring tools to construct resource tree structures (by using transaction ID injection at the root of the request and tracing the transaction ID through the fulfillment of the request).

For each classification, the system can identify the most likely resource tree structure that corresponds to a request class (e.g., through mapping of classifications and attributes to probabilistic resource trees). The system can also perform a classifying of the resource tree structures into matching sets (where each unique resource tree identified through a particular trace maps to a set of incoming requests) and a placing of the matching sets into a lookup table (where the keys are individual resource trees and the values are a list of requests that corresponded to that particular resource tree). An example look-up table is shown in Table 1—Resource Tree Lookup Table. The lookup Table 1 is an example of matching a set of unique resource trees to a set of observed requests, and should not be limiting. Note that each unique resource tree is unique to a set of requests, headers, and URIs. In turn, a single request can match a single unique resource tree.

TABLE 1

Resource Tree Lookup Table

| Resource Tree | Request Type | Header | URI |
|---|---|---|---|
| Tree 1 | Request 1 | Header 1 | URI 1 |
| Tree 2 | Request 2, 3 | Header 2, 3 | URI 2, URI 3 |
| ... | ... | ... | ... |
| Tree N | Request N | Header N | URI N |

Figure 8:
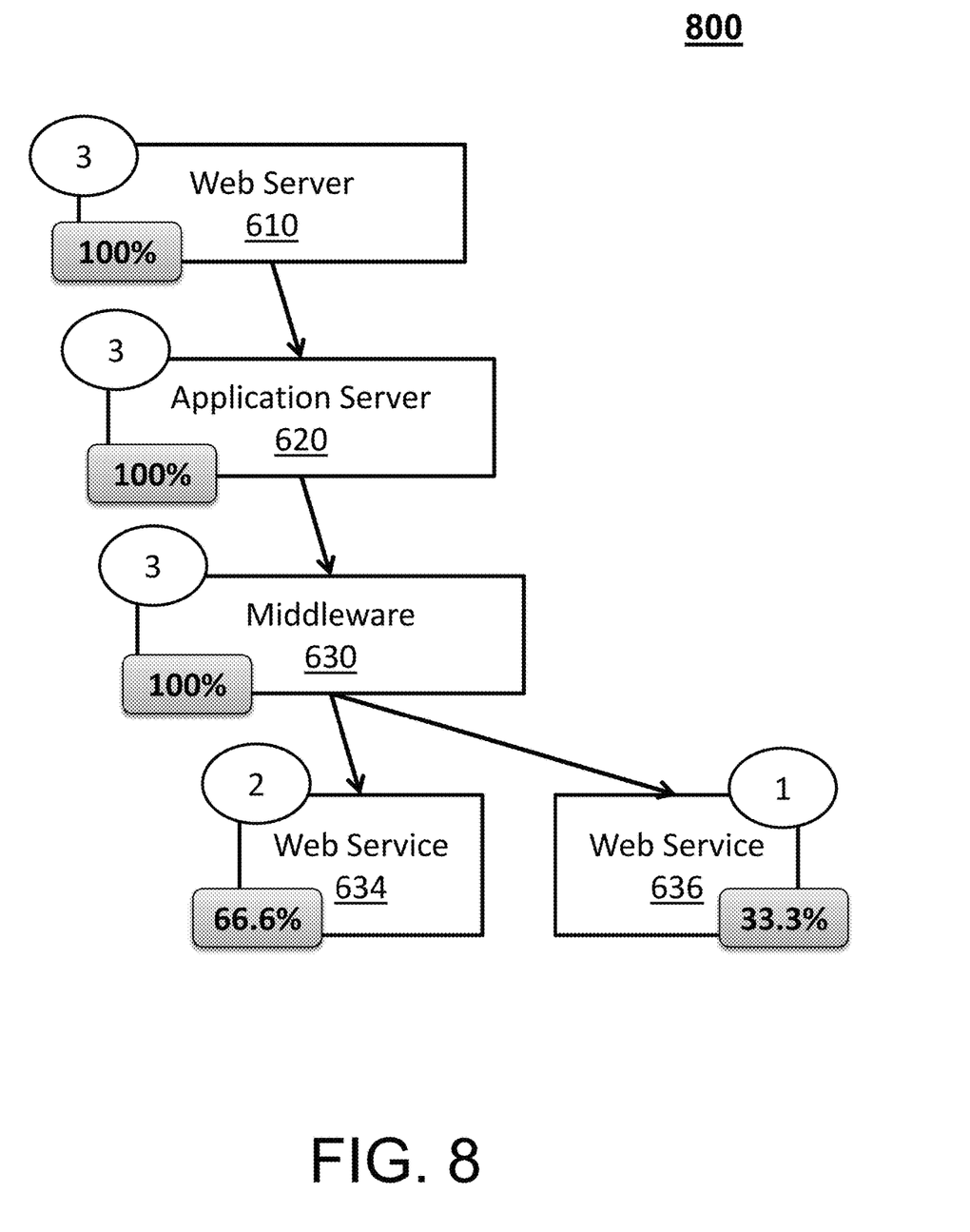
FIG. 8 continues the illustration of the component analysis of FIGS. 5 and 6 in accordance with an embodiment.

Further, to determine rules for handling web requests, the system analyzes data of the resource tree structures. For instance, the system analyzes the request patterns for each resource tree looking for particular URI patterns and/or combinations of particular URL parameters (e.g. are some percentage). Turning now to FIG. 8, a resource tree 800 is shown with probability annotations. As shown in FIG. 8, the system utilizes all the input combinations to perform a tree traversal (depth-first) to identify the most probable input combinations for each leaf in the matching trace tree. For instance, at each node, the system divides the previously incremented leaf/branch count by the total count at the root to find the probability of any request of reaching each leaf/branch. In this way, the web server 610 includes a 100% probability annotation; the application server 620 includes a 100% probability annotation; the middleware 630 includes a 100% probability annotation; the web service 634 includes a 66.6% probability annotation; and the web service 636 includes a 33.3% probability annotation.

The system can also set a predetermined failure risks. An example of a predetermined failure risk is probability threshold to limit the total rule size. The probability threshold limit can be adjustable, where a first value can be set (e.g., 90% as a base) and adjusted up or down as needed. In turn, the system can construct a matching classification rule by traversing the parse tree to obtain only those branches that meet the probability threshold. For example, given the 90% probability threshold, by traversing the tree arrives at Request A, which is the most probable classification rule. Thus, the system knows with a better than 90% probability that all requests matching the Request A will need the resources represented by Tree A.

In addition, a set of "most probable" rules can be deduced for determining the uniform resource location (URL) or other request attributes of requests that corresponds to each resource tree. In this way, as a monitoring tool determines that a part of that resource tree is in a "bad" state, the system can turn those rules on or off to turn back requests that may fail due to the use of a failing resource tree node.

At block 515, the system receives a new web request. At block 520, the system analyzes the new web request to identify a resource tree for handling the new web request. The system can utilize one of a plurality of options for determining a structure of the resource tree. In an embodiment, the resource tree can be determined via a-priori through analysis of the code or analysis of artifacts, such as deployment descriptors. In another embodiment, the system can deduce the resource tree for a particular request from similarities to other requests.

In this latter embodiment, statistical analysis of requests over time is used by the system to determine a likelihood of the use of a particular node in a resource tree based upon the set of requests that use that node. For example, each time a request comes in the system can identify the class of request by evaluating the classification rule and identify the likely resource tree structure corresponding to that class.

At block 525, the system can determine if there are any known issues with the likely resource tree. For example, the system can detect a problem preventing a usage of a resource in the resource tree exceeding a predetermined failure risk.

At block 530, performing an action to avoid a failure of the new web request. Actions include but are not limited to not starting the web request and delaying the web request. A decline to route the request at the root of the resource tree (at the web server or intelligent router) can also be coupled with sending an error message. With respect to delaying the web request, a queue can be utilized that holds the request for a period of time, at the conclusion of with a re-evaluation of the routing can be performed. If not, then route the request as usual. Note that the blocks 515-530 can be perform very efficiently with respect routing of the request, and thus the system will not be adversely impacted.

Technical effects and benefits of embodiments described herein include avoid utilizing processing cycles to implement any request that will need offline/unavailable resources. Thus, embodiments described herein are necessarily rooted in application servers to perform proactive operations to overcome problems specifically arising in the realm of web request implementation (e.g., these problems include the wasted processing cycles, resulting in unwanted costs and expenses).

Embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described herein with reference to flowchart illustrations and/or block diagrams of methods, apparatus (systems), and computer programs products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for avoiding utilizing processing cycles to implement any web request that will need offline or unavailable resources by predicting and avoiding request failures, comprising:

monitoring, by a processor coupled to a memory, a plurality of requests to identify resource utilization flows comprising nodes and application components;

analyzing, by the processor, a history of a plurality of requests to map classifications and attributes to a plurality of probabilistic resource trees for managing the plurality of requests, by managing and building a resource history of operations that identify the resource utilization flows;

receiving, by the processor, a web request for access to at least one web service;

analyzing, by the processor, the web request to identify at least one tree of the plurality of probabilistic resource trees for handling the web request, the at least one probabilistic resource tree comprises a path through a set of known servers that an implementation of the request follows to fulfill the request;

detecting, by the processor, a problem preventing a usage of a resource in the at least one tree, wherein the problem is at least one of a node failure, an overload, a blocking, and a problem state, wherein the problem causes the web request to fail upon implementation of the web request; and performing, by the processor, an action comprising reverting of the web request at a beginning of the implementation to avoid the problem and loss of resources.

2. The method of claim 1, wherein the analyzing of the web request includes matching the web request to the at least one probabilistic resource tree based on a mapped classification or a mapped attribute.

3. A computer program product, the computer program product comprising a computer readable storage medium having program instructions for avoiding utilizing processing cycles to implement any web request that will need offline or unavailable resources by predicting and avoiding request failures embodied therewith, the program instructions executable by a processor to cause the processor to perform:

monitoring a plurality of requests to identify resource utilization flows comprising nodes and application components;

analyzing a history of a plurality of requests to map classifications and attributes to a plurality of probabilistic resource trees for managing the plurality of requests, by managing and building a resource history of operations that identify the resource utilization flows;

receiving a web request for access to at least one web service;

analyzing the web request to identify at least one tree of the plurality of probabilistic resource trees for handling the web request, the at least one probabilistic resource tree comprises a path through a set of known servers that an implementation of the request follows to fulfill the request;

detecting a problem preventing a usage of a resource in the at least one tree, wherein the problem is at least one of a node failure, an overload, a blocking, and a problem state, wherein the problem causes the web request to fail upon implementation of the web request; and performing an action comprising reverting of the web request at a beginning of the implementation to avoid the problem and loss of resources.

4. The computer program product of claim 3, wherein the analyzing of the web request includes matching the web request to the at least one tree based on a mapped classification or a mapped attribute.

5. A system for avoiding utilizing processing cycles to implement any web request that will need offline or unavailable resources by predicting and avoiding request failures, the system comprising:

a memory having computer readable instructions; and a processor for executing the computer readable instructions, the computer readable instructions causing the system to perform:

monitoring a plurality of requests to identify resource utilization flows comprising nodes and application components;

analyzing a history of a plurality of requests to map classifications and attributes to a plurality of probabilistic resource trees for managing the plurality of requests, by managing and building a resource history of operations that identify the resource utilization flows;

receiving a web request for access to at least one web service;

analyzing the web request to identify at least one tree of the plurality of probabilistic resource trees for handling the web request, the at least one probabilistic resource tree comprises a path through a set of known servers that an implementation of the request follows to fulfill the request;

detecting a problem preventing a usage of a resource in the at least one tree, wherein the problem is at least one of a node failure, an overload, a blocking, and a problem state, wherein the problem causes the web request to fail upon implementation of the web request; and performing an action comprising reverting of the web request at a beginning of the implementation to avoid the problem and loss of resources.

6. The system of claim 5, wherein the analyzing of the web request includes matching the web request to the at least one probabilistic resource tree based on a mapped classification or a mapped attribute.

* * * * *